US012794256B2

(12) United States Patent
Blasko et al.

(10) Patent No.: US 12,794,256 B2
(45) Date of Patent: Nov. 10, 2026

(54) ELECTRIC AIRCRAFT WITH POWER GENERATION AND DISTRIBUTION SYSTEM

(71) Applicant: Lockheed Martin Corporation, Bethesda, MD (US)

(72) Inventors: Vladimir Blasko, Stratford, CT (US); Marc A. Antonetz, Orange, CT (US); Elvis A. Crespo, Quaker Hill, CT (US); Erez Eller, Plymouth, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 94 days.

(21) Appl. No.: 18/630,744

(22) Filed: Apr. 9, 2024

(65) Prior Publication Data

US 2025/0316998 A1 Oct. 9, 2025

(51) Int. Cl.

| | |
|---|---|
| ***H02J 7/00*** | (2026.01) |
| ***B64C 29/00*** | (2006.01) |
| ***B64D 27/33*** | (2024.01) |
| ***B64D 27/357*** | (2024.01) |
| ***H02J 4/00*** | (2026.01) |

(52) U.S. Cl.

CPC .............. *H02J 7/855* (2026.01); *B64D 27/33* (2024.01); *B64D 27/357* (2024.01); *H02J 4/00* (2013.01); *B64C 29/00* (2013.01); *B64D 2221/00* (2013.01)

(58) Field of Classification Search

None

See application file for complete search history.

(56) References Cited

U.S. PATENT DOCUMENTS

| | | | | |
|---|---|---|---|---|
| 9,376,208 | B1 | 6/2016 | Gentry | |
| 11,710,957 | B1 | 7/2023 | Manadan et al. | |
| 2012/0086266 | A1* | 4/2012 | Shipley | H02J 4/00 307/9.1 |
| 2015/0256112 | A1* | 9/2015 | Weiss | H02M 7/537 318/400.3 |
| 2016/0280394 | A1* | 9/2016 | Radun | H02J 1/10 |
| 2016/0359324 | A1* | 12/2016 | Knowles | H02J 1/10 |

(Continued)

FOREIGN PATENT DOCUMENTS

| | | | |
|---|---|---|---|
| CN | 115432190 | B | 12/2022 |
| WO | WO-2022/238653 | A1 | 11/2022 |

OTHER PUBLICATIONS

Extended European Search Report on European Patent Application No. 25168950.1 dated Sep. 29, 2025 (9 pages).

*Primary Examiner* — Menatoallah Youssef
*Assistant Examiner* — Aqeel H Bukhari
(74) *Attorney, Agent, or Firm* — Foley & Lardner LLP

(57) ABSTRACT

A power generation and distribution system for an aircraft includes generators, motors, junction boxes, and backup batteries. The generators are driven by a turbine engine to produce electrical power. The motors are configured to drive propellers of the electric aircraft. One or more of the junction boxes include contactors transitionable between an open position and a closed position. The junction boxes are each configured to selectively provide electrical power from at least one of the generators to at least one of the motors. The backup batteries are configured to provide electrical power to the motors through the plurality of junction boxes to power the plurality of motors for at least a remedial procedure.

20 Claims, 8 Drawing Sheets

(56) References Cited

U.S. PATENT DOCUMENTS

| | | | | |
|---|---|---|---|---|
| 2017/0203839 | A1* | 7/2017 | Giannini | B64C 39/12 |
| 2020/0321649 | A1* | 10/2020 | Zhan | H01M 10/0445 |
| 2020/0354073 | A1 | 11/2020 | Miftakhov | |
| 2021/0339850 | A1 | 11/2021 | Predonu et al. | |
| 2021/0391727 | A1 | 12/2021 | Devautour | |
| 2022/0127011 | A1 | 4/2022 | Long et al. | |
| 2022/0185489 | A1* | 6/2022 | Thiriet | B64D 27/04 |
| 2022/0204173 | A1 | 6/2022 | Barraco et al. | |
| 2022/0250759 | A1 | 8/2022 | Yu et al. | |
| 2022/0281611 | A1 | 9/2022 | Bruce | |
| 2023/0182908 | A1* | 6/2023 | Kumar | B64D 27/10<br>244/53 R |
| 2023/0182920 | A1* | 6/2023 | Moore | B64D 31/06<br>244/53 R |
| 2025/0202230 | A1* | 6/2025 | Pan | H02P 1/58 |

* cited by examiner

ELECTRIC AIRCRAFT WITH POWER GENERATION AND DISTRIBUTION SYSTEM

FIELD

The present disclosure relates to hybrid electric vertical take-off and landing (eVTOL) aircrafts.

BACKGROUND eVTOL aircrafts use electrical power to take-off, fly, hover, and land. If failure of one or more electrical components occur, emergency procedures may be prompted. Additionally, failure of a first electrical component can result in other malfunctions.

SUMMARY

One embodiment of the present disclosure is a power generation and distribution system for an electric aircraft. The power generation and distribution system includes multiple generators, motors, junction boxes, and backup batteries. The generators are driven by a turbine engine to produce electrical power. The motors are configured to drive propellers of the electric aircraft. One or more of the junction boxes include contactors transitionable between an open position and a closed position. The junction boxes are each configured to selectively provide electrical power from at least one of the generators to at least one of the motors. The backup batteries are configured to provide electrical power to the plurality of motors through the junction boxes to power the motors during at least a remedial or emergency procedure when the produced electrical power is not supplied by one or more of the generators.

In some embodiments, the junction boxes include a first junction box and a second junction box. The first junction box is configured to receive electrical power from a first of the generators. The first junction box is configured to direct power from the first of the generators to at least one of a first motor or a second motor of the motors. The second junction box is configured to receive electrical power from a second of the generators. The second junction box is configured to direct power from the second of the generators to at least one of the first motor or the second motor.

In some embodiments, the junction boxes further include a third junction box. The third junction box is configured to receive and sum electrical power from both the first junction box and the second junction box. The third junction box is configured to direct power from the first junction box and the second junction box to at least one of the first motor or the second motor.

In some embodiments, the first junction box, the second junction box, and the third junction box provide different paths to provide electrical power from the generators to each of the motors. The different paths provide redundancy such that the electrical power can be provided from at least one of the generators to the motors responsive to failure of one of the generators or a short circuit or open circuit in a cable of the power generation and distribution system.

In some embodiments, each of the backup batteries are configured to receive electrical power from one or more of the generators through a corresponding one of the junction boxes. The backup batteries are electrically coupled with each other in parallel and include first contactors transitionable into an open position to electrically de-couple one or more of the backup batteries from the parallel arrangement, and second contactors transitionable into an open position to electrically de-couple any of the backup batteries from the corresponding one of the junction boxes. In some embodiments, the first contactors of the backup batteries and the second contactors are solid state switches configured to transition between the open position and a closed position.

In some embodiments, the power generation and distribution system further includes a pre-charge circuit provided for at least one of the junction boxes. The pre-charge circuit includes a main cable and a first contactor, a bypass cable and a second contactor, and a resistor positioned along the bypass cable. When the power generation and distribution system is powered on, the first contactor is maintained in an open position and the second contactor is transitioned into a closed position so that electrical power passes through the bypass cable and the resistor. The first contactor is maintained in the open position and the second contactor maintained in the closed position until capacitors downstream of the pre-charge circuit are charged. In response to the capacitors being charged, the first contactor is transitioned into the closed position and the second contactor is transitioned into the open position so that the electrical power flows through the main cable and the first contactor.

Another embodiment of the present disclosure is an electric aircraft. The electric aircraft includes a fuselage, wings, propellers, and a power generation and distribution system. The wings are rotatably coupled with the fuselage and configured to be driven to rotate relative to the fuselage. The power generation and distribution system includes generators, motors, junction boxes, and backup batteries. The generators are driven by a turbine engine to produce electrical power. The motors are configured to drive the propellers of the electric aircraft. Each of the junction boxes includes contactors transitionable between an open position and a closed position. The junction boxes are each configured to selectively provide electrical power from at least one of the generators to at least one of the motors. The backup batteries are configured to provide electrical power to the plurality of motors through the junction boxes to power the motors during at least a remedial or emergency procedure.

In some embodiments, the junction boxes include a first junction box and a second junction box. The first junction box is configured to receive electrical power from a first of the generators. The first junction box is configured to direct power from the first of the generators to at least one of a first motor or a second motor of the motors. The second junction box is configured to receive electrical power from a second of the generators. The second junction box is configured to direct power from the second of the generators to at least one of the first motor or the second motor of the motors.

In some embodiments, the junction boxes further include a third junction box. The third junction box is configured to receive and sum electrical power from both the first junction box and the second junction box. The third junction box is configured to direct power from the first junction box and the second junction box to at least one of the first motor or the second motor of the motors.

In some embodiments, the first junction box, the second junction box, and the third junction box provide different paths to provide electrical power from the generators to each of the motors. The plurality of different paths provide redundancy such that the electrical power can be provided from at least one of the generators to the motors responsive to failure of one of the generators or a short circuit or open circuit in a cable of the power generation and distribution system.

In some embodiments, each of the backup batteries are configured to receive electrical power from one or more of the generators through a corresponding one of the junction boxes. The backup batteries are electrically coupled with each other in parallel and include first contactors transitionable into an open position to electrically de-couple one or more of the backup batteries from the parallel arrangement, and second contactors transitionable into an open position to electrically de-couple any of the backup batteries from the corresponding one of the junction boxes. In some embodiments, the first contactors of the backup batteries and the second contactors of the backup batteries are solid state switches configured to transition between a non-conducting state and a conducting state.

In some embodiments, the electric aircraft further includes a pre-charge circuit provided for at least one of the junction boxes. The pre-charge circuit includes a main cable and a first contactor. The pre-charge circuit also includes a bypass cable and a second contactor. The pre-charge circuit also includes a resistor positioned along the bypass cable. When the power generation and distribution system is powered on, the first contactor is maintained in an open position and the second contactor is transitioned into a closed position so that electrical power passes through the bypass cable and the resistor. The first contactor is maintained in the open position and the second contactor maintained in the closed position until capacitors downstream of the pre-charge circuit are charged. In response to the capacitors being charged, the first contactor is transitioned into the closed position and the second contactor is transitioned into the open position so that the electrical power flows through the main cable and the first contactor.

Another embodiment of the present disclosure is a method for generating and distributing power for an electric aircraft. The method includes providing a power generation and distribution system including generators driven by a turbine engine to produce electrical power, a motors configured to drive propellers, junction boxes each configured to direct power from at least one of the generators to at least one of the motors, and backup batteries. The method includes starting the power generation and distribution system. The method includes, responsive to increased demand for power at one or more of the motors, discharge energy from at least one of the backup batteries to supplement the electrical power produced by the generators to meet the increased demand at the one or more of the motors. The method includes, responsive to failure of at least one of the generators, discharge power from the backup batteries to the motors to perform a remedial or emergency procedure with the electric aircraft.

In some embodiments, starting the power generation and distribution system includes initiating operation of the turbine engine and the generators to produce electrical power. Starting the power generation and distribution system also includes operating a first contactor of a bypass cable of a pre-charge circuit to transition into a closed position such that the electrical power flows through the bypass cable, the first contactor, and a resistor. The first contactor of the pre-charge circuit is maintained in the closed position until capacitors downstream at motor inverters are balanced with voltage at converters. Starting the power generation and distribution system also includes, responsive to the capacitor at the motor inverters being balanced with the voltage at the converters, operating the first contactor into an open position and operating a second contactor of a main cable from an open position into a closed position such that electrical power generated by the generators flows through the main cable to the junction boxes and the motors.

In some embodiments, the method further includes, responsive to the motors being back-driven by the propellers and generating electrical power, at least one of charging the backup batteries or dissipating the electrical power generated by the back-driving of the motors.

In some embodiments, the junction boxes provide different paths for the transfer of electrical power from the generators to the motors. The junction boxes each include contactors. The method includes, responsive to failure of a component, operating the contactors of the junction boxes to provide electrical power from the generators to the motors bypassing the component.

In some embodiments, the junction boxes include a first junction box and a second junction box. The first junction box is configured to receive electrical power from a first generator of a plurality of generators. The first junction box is configured to direct power from the first of the generators to at least one of a first motor or a second motor of a plurality of motors. The second junction box is configured to receive electrical power from a second of the generator of the plurality of generators. The second junction box is configured to direct power from the second of the generators to at least one of the first motor or the second motor of the motors.

In some embodiments, junction boxes further include a third junction box. The third junction box is configured to receive and sum electrical power from both the first junction box and the second junction box. The third junction box is configured to direct power from the first junction box and the second junction box to at least one of the first motor or the second motor.

It will be recognized that the figures are the schematic representations for purposes of illustration. The figures are provided for the purpose of illustrating one or more implementations with the explicit understanding that the figures will not be used to limit the scope of the meaning of the claims.

DETAILED DESCRIPTION

Following below are more detailed descriptions of various concepts related to, and implementations of, methods and apparatuses relating to a power generation and distribution system. The various concepts introduced above and discussed in greater detail below may be implemented in any of a number of ways, as the described concepts are not limited to any particular manner of implementation. Examples of specific implementations and applications are provided primarily for illustrative purposes.

Overview

Referring to the figures generally, an electric aircraft includes a power generation and distribution system. The power generation and distribution system includes multiple generators, junction boxes, motors, backup batteries, and propellers. The generators are driven by a turbine engine that consumes fuel and generate electrical power. The junction boxes receive electrical power from the generators and provide multiple paths to provide the electrical power to the motors. The backup batteries can also have multiple paths to exchange electrical energy with the motors or the generators through the junction boxes. Advantageously, the power generation and distribution system has multiple redundancies such that if a component fails, power can still be provided to the motors. The backup batteries can also provide a reserve power source such that if the turbine engine or all of the generators fail, the electric aircraft can use the reserve power source to land.

Electric Vertical Take-Off and Landing (eVTOL) Aircraft

Figure 1:
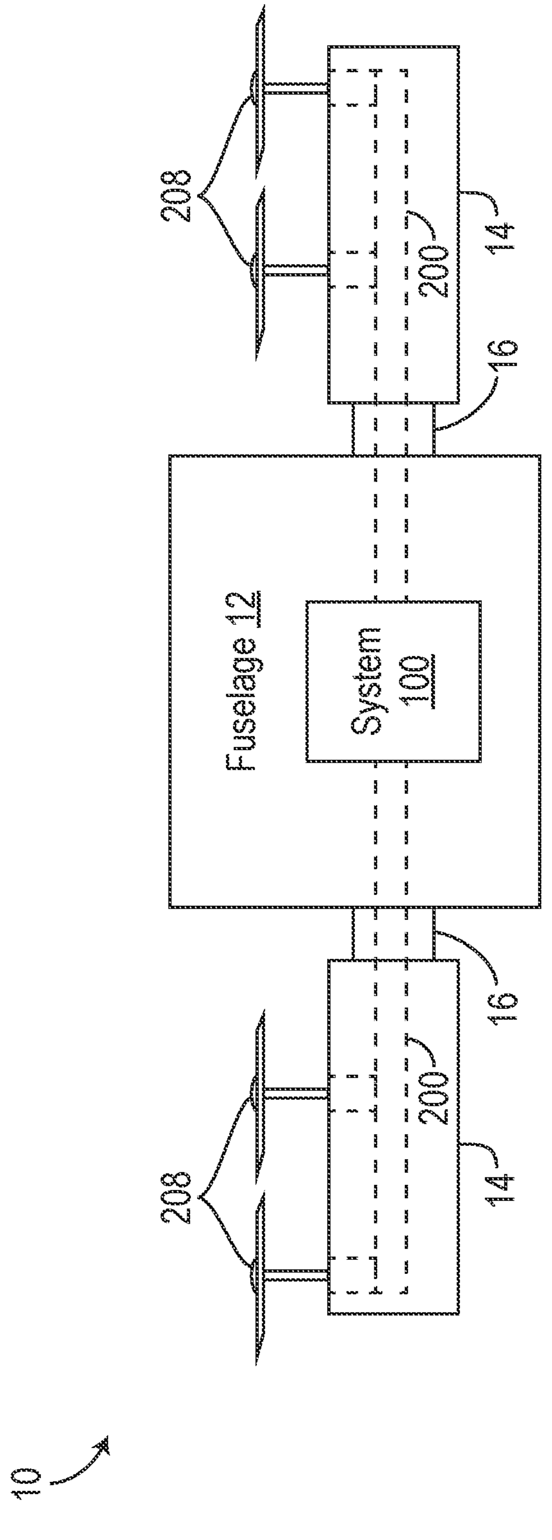
FIG. 1 is a perspective view of an electric vertical take-off and landing (eVTOL) aircraft, according to some embodiments.

Referring to FIG. 1, an electric vertical take-off and landing (eVTOL) aircraft 10 includes a fuselage 12 and wings 14. The wings 14 are coupled with the fuselage 12 and are configured to provide lift for the electric aircraft 10. The wings 14 may be pivotally coupled with the fuselage 12 such that the wings 14 can rotate about an axis that extends laterally from the fuselage 12 of the electric aircraft 10. The wings 14 include propellers 208 that are configured to be driven by a power generation and distribution system 100 of the aircraft 10 in order to generate lift and thrust, or a combination thereof, depending on the orientation of the wings 14. The propellers 208 may be driven through one or more propeller nacelles 200 that transmit power from the power generation and distribution system 100 to the propellers 208. In some embodiments, the wings 14 are coupled with the fuselage 12 through couplers 16. The power generation and distribution system 100 may be provided on any series of hybrid aircraft (e.g., a coaxial VTOL, a tandem VTOL, a side-by-side or intermeshing helicopter, a tiltrotor or tiltwing aircraft, etc.)

Power Generation and Distribution System

Figure 2:
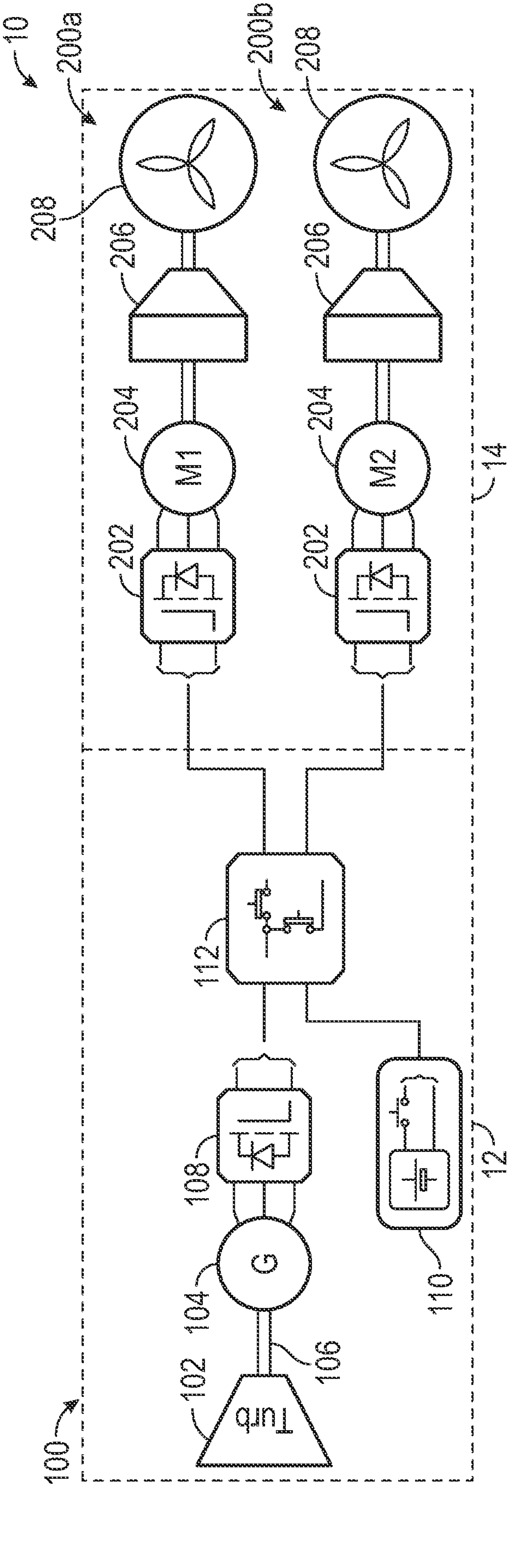
FIG. 2 is a diagram of a power generation and distribution system for the eVTOL of FIG. 1, according to some embodiments.

Referring to FIG. 2, the eVTOL aircraft 10 includes the power generation and distribution system 100, multiple propeller nacelles 200. In particular, the eVTOL aircraft 10 may include a first propeller nacelle 200*a* and a second propeller nacelle 200*b* that receive electrical energy from the power generation and distribution system 100 and drive propellers 208 in order to perform take-offs, landings, hovering, flight maneuvers, etc. The power generation and distribution system 100 is positioned in the fuselage 12 of the aircraft 10, according to some embodiments. The propeller nacelles 200 are positioned in the wings 14, according to some embodiments.

The generation and distribution system 100 includes a turbine engine 102 that consumes fuel and is driven to rotate due to consumption of the fuel. The generation and distribution system 100 also includes multiple generators 104 that are driven by the turbine engine 102 through a driveshaft 106. In some embodiments, the generation and distribution system 100 includes the generator 104 directly mounted on the front of the turbine engine 102 (e.g., without a driveshaft). In some embodiments, the turbine engine 102 gear drives two or more generators 104 that are side-by-side in order to reduce length of the generation and distribution system 100 (e.g., the propulsion system of the aircraft 10). In some embodiments, the generation and distribution system 100 includes multiple redundancies inside a single generator 104. The generator 104 is configured to generate electrical energy for powering electrical components of the aircraft 10. The generation and distribution system 100 also includes a converter 108 (e.g., including a rectifier) that is configured to convert between three-phase alternating current (AC) and direct current (DC). In particular, the converter 108 is configured to receive three-phase AC, convert the three-phase AC, and output DC power to a distribution panel 112. The distribution panel 112 is also configured to receive DC electrical power from a backup battery 110. The distribution panel 112 is configured to output DC electrical power to the propeller nacelles 200. Each of the propeller nacelles 200 includes one or more inverters 202, a motor 204, a gearbox 206, and a propeller 208. The inverters 202 may receive the DC power from the distribution panel 112, and convert the DC power into three-phase AC power or AC power required by the motors 204. The motors 204 consume the AC power from the inverters 202 and drive the propeller 208 through the gearbox 206.

Figure 3A:
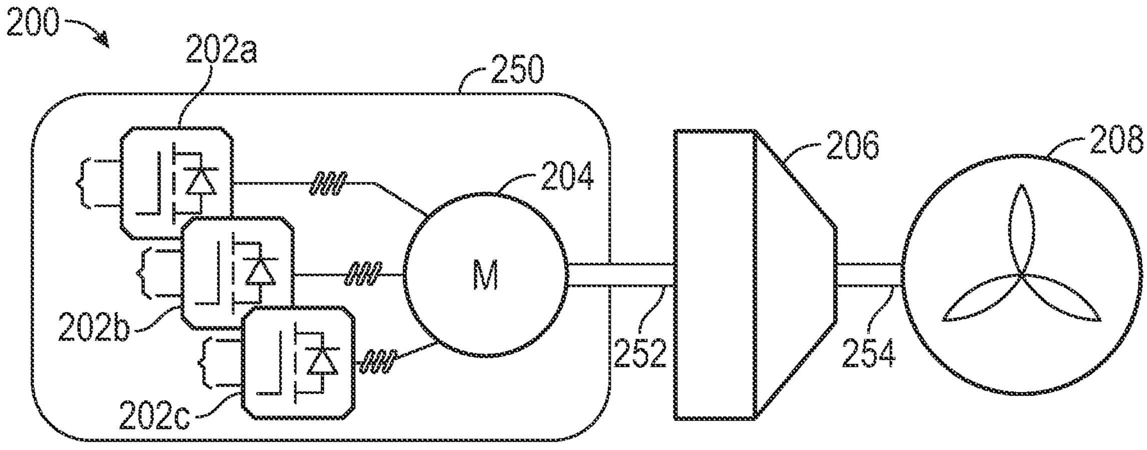
FIG. 3A is a diagram of a first motor-gearbox system for a propeller of the eVTOL of FIG. 1, according to some embodiments.

Referring to FIG. 3A, a first embodiment of the propeller nacelles 200 includes three inverters 202 (e.g., speed control units) that receive the DC power from the distribution panel 112 and provide AC power (e.g., three-phase AC power) to a single motor 204. It should be understood that the propeller nacelles 200 may include more or less than three inverters 202. For example, the propeller nacelles 200 may include two, three, or four inverters 202 or a different number of inverters. The motor 204 and the inverters 202 may be provided as a unit, package, or assembly as a motor assembly 250. The motor 204 drives the gearbox 206 through a driveshaft 252, and the gearbox 206 drives the propeller 208 through a driveshaft 254, according to some embodiments. The inverters 202 advantageously provide triple redundancy for the motor 204 and therefore for driving the propeller 208. In this way, if one of the inverters 202 fails, the propeller 208 may still be driven to sustain flight of the aircraft 10, at reduced available power.

Figure 3B:
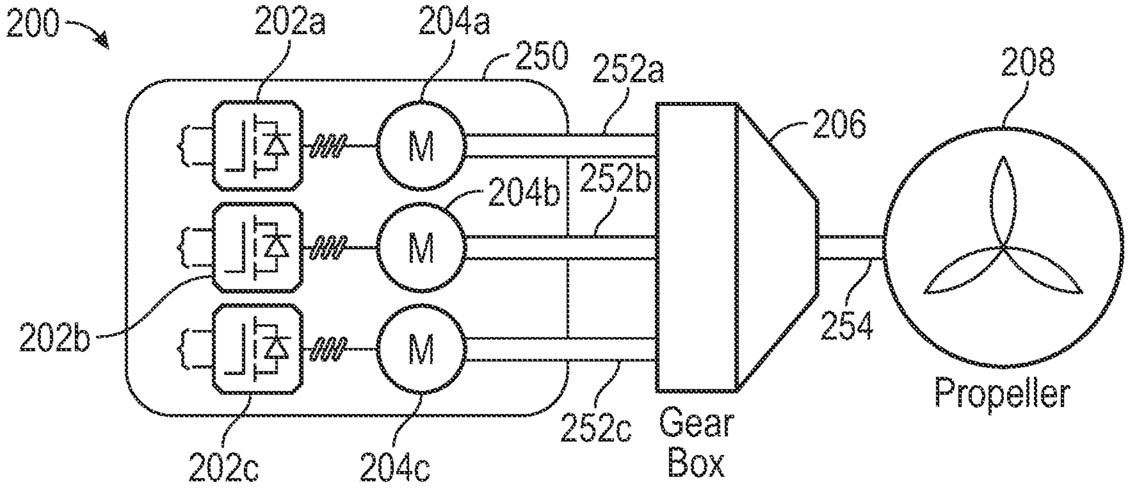
FIG. 3B is a diagram of a second motor-gearbox system for a propeller of the e VTOL of FIG. 1, according to some embodiments.

Referring to FIG. 3B, a second embodiment of the propeller nacelles 200 includes three power inverters 202, shown as power inverter 202*a*, power inverter 202*b*, and power inverter 202*c*, three motors 204, shown as motor 204*a*, motor 204*b*, and motor 204*c*, the gearbox 206, and the propeller 208. Each of the motors 204 is provided with AC power by a corresponding inverter 202. The motors 204 provide rotational kinetic energy or torque to the gearbox 206 through three separate driveshafts 252, shown as first driveshaft 252$a$, second driveshaft 252$b$, and third driveshaft 252$c$, according to some embodiments. The gearbox 206 outputs transformed rotational kinetic energy or torque to drive the propeller 208 through the driveshaft 254. Advantageously, the embodiment of the propeller nacelle 200 as shown in FIG. 3B also includes triple redundancy in the form of the three separate motors 204 and the three separate inverters 202. The propeller 208 can be configured such that, if one of the motors 204 or inverters 202 fails, the propeller 208 can still be driven to sustain flight of the aircraft 10.

Figure 4:
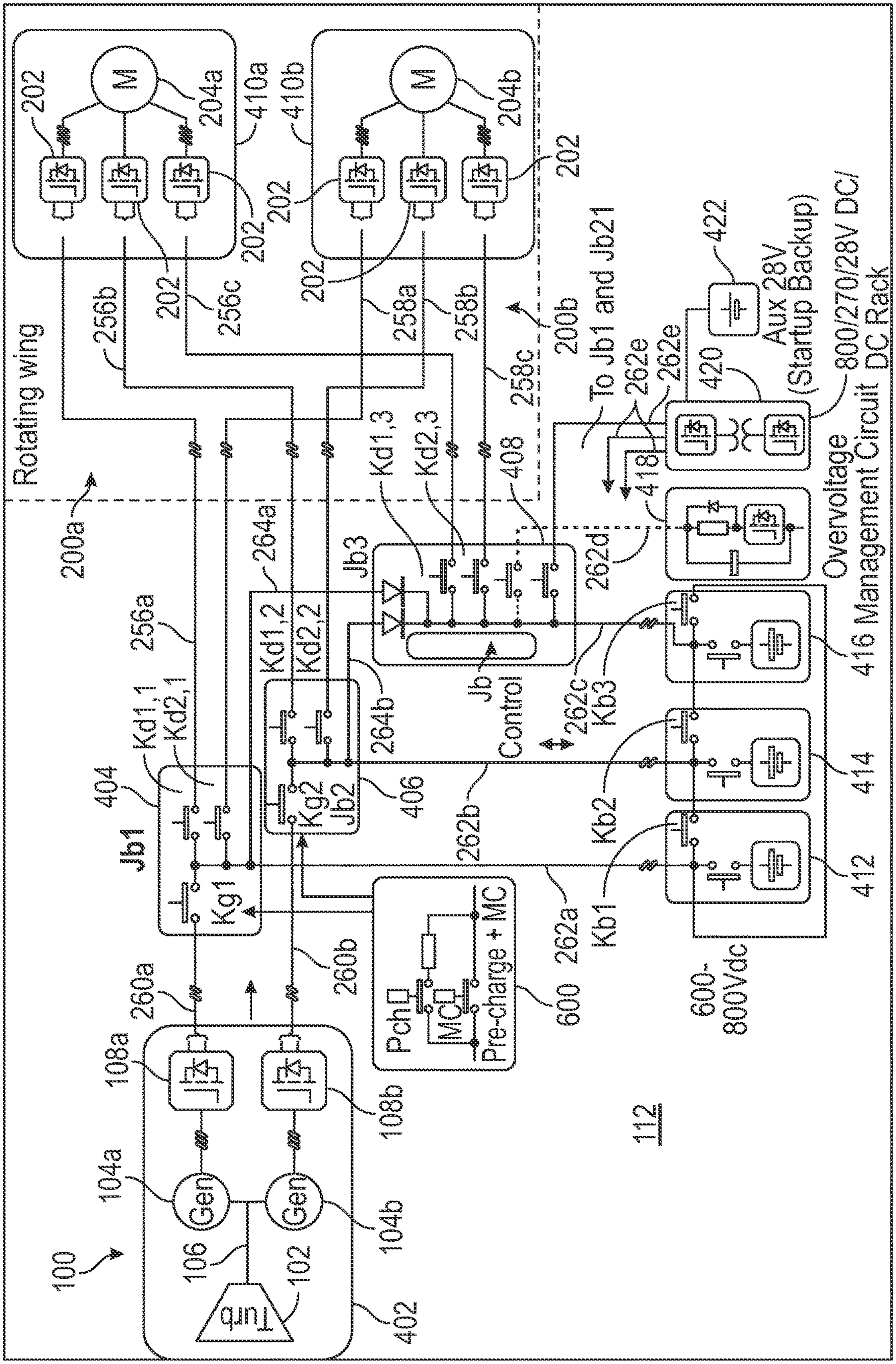
FIG. 4 is a diagram of a power generation and distribution system of the eVTOL of FIG. 1, according to some embodiments.

Referring to FIG. 4, the distribution panel 112 is shown in greater detail, according to some embodiments. The distribution panel 112 includes a first junction box 404, a second junction box 406, and a third junction box 408. The first junction box 404 and the second junction box 406 are configured to receive DC electrical power from a first converter 108$a$ and a second converter 108$b$ through cable 260$a$ and cable 260$b$, respectively. The generation and distribution system 100 includes a first generator 104$a$ and a second generator 104$b$ that are both driven by the turbine engine 102. The first generator 104$a$ and the second generator 104$b$ are directly driven by the turbine engine 102 in some embodiments. In some embodiments, the first generator 104$a$ and the second generator 104$b$ are driven through gears by the turbine engine 102. Each of the first generator 104$a$ and the second generator 104$b$ include corresponding converters 108, shown as first converter 108$a$ and second converter 108$b$ which receives AC power from the generator 104 and outputs DC power. The first converter 108$a$ provides DC power to the first junction box 404 through cable 260$a$, while the second converter 108$b$ provides DC power to the second junction box 406 through cable 260$b$, according to some embodiments. The turbine engine 102, the generators 104, and the converters 108 may be positioned inside of a modular housing 402.

Figure 5:
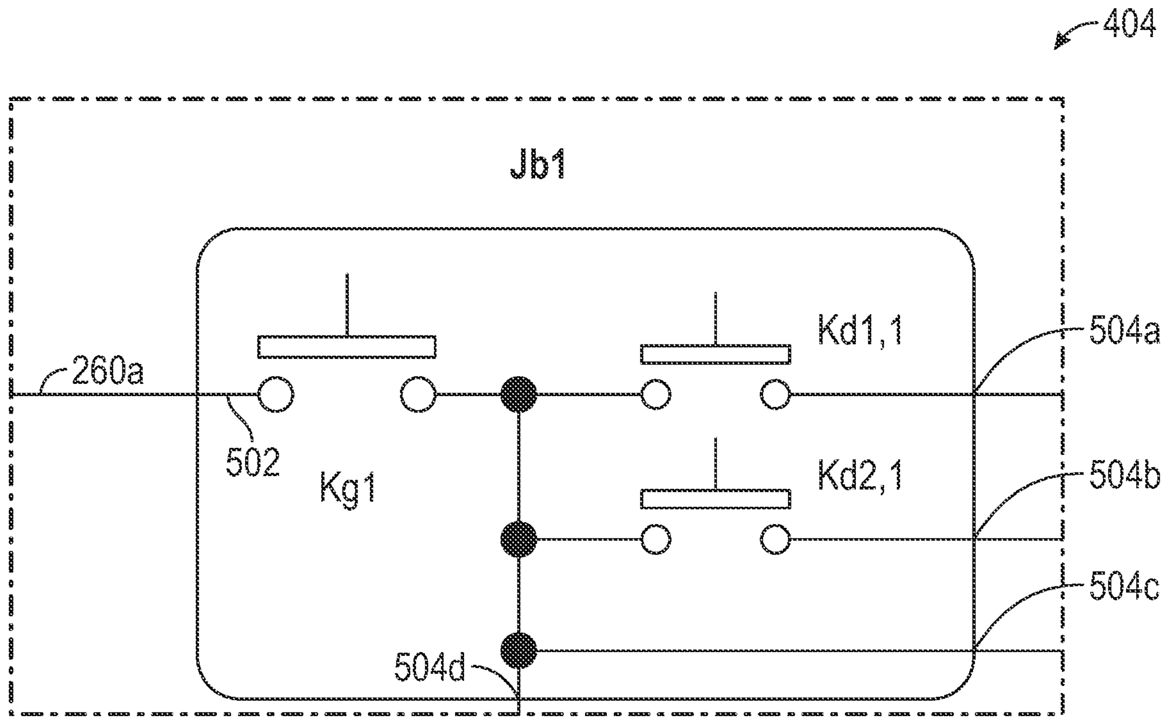
FIG. 5 is a diagram of a first junction box of the power generation and distribution system of FIG. 4, according to some embodiments.

Referring to FIGS. 4 and 5, the first junction box 404 (JB1) includes multiple contacts or switches, shown as switch $Kg_1$, switch $Kd_{1,1}$, and switch $Kd_{2,1}$. The switches may be mechanically operated or contactor switches. The first generator 104$a$ and the first converter 108$a$ provide DC electrical power through the cable 260$a$ to an input 502 of the first junction box 404 at an input of the switch $Kg_1$. The switch $Kg_1$ may be operated to transition between an open and closed position in order to restrict or allow the transfer of energy through the first junction box 404. The switch $Kd_{1,1}$ and the switch $Kd_{2,1}$ are electrically coupled with an output of the switch $Kg_1$ and are configured to transition between an open position and a closed position to route electrical power through a first output 504$a$ of the first junction box 404 to the first motor assembly 410$a$ (e.g., the first motor 204$a$) through a cable 256$a$ or to the second motor assembly 410$b$ (e.g., the second motor 204$b$) through a second output 504$b$ and a cable 258$a$. For example, when the switch $Kg_1$ is open, power is limited from being transferred from the first generator 104$a$ and the first converter 108$a$ to either of the first motor 204$a$ or the second motor 204$b$ through the first junction box 404. When the switch $Kg_1$ is closed and the switch $Kd_{1,1}$ is also closed, the first junction box 404 transfers power from the first generator 104$a$ and the first converter 108$a$ to the first motor 204$a$ through cable 256$a$. When the switch $Kg_1$ is closed and the switch $Kd_{2,1}$ is closed, the first junction box 404 transfers power from the first generator 104$a$ and the first converter 108$a$ to the second motor 204$b$ through cable 258$a$. In this way, the first junction box 404 is configured to transfer power from the first generator 104$a$ and the first converter 108$a$ to either the first motor 204$a$ or the second motor 204, or both (e.g., if both switch $Kd_{1,1}$ and switch $Kd_{2,1}$ are closed).

The first junction box 404 also includes a third output 504$c$ and a fourth output 504$d$. The third output 504$c$ forms a continuous path with the input 502 through the first junction box 404 when the switch $Kg_1$ is closed. Likewise, the fourth output 504$d$ forms a continuous path with the input 502 through the first junction box 404 when the switch $Kg_1$ is closed. The third output 504$c$ electrically couples with an input of the third junction box 408 through cable 264$a$. The fourth output 504$d$ electrically couples with a first backup battery pack 412 through cable 262$a$ such that the first junction box 404 can exchange energy with the first backup battery pack 412. The first backup battery pack 412 may be charged (e.g., receive electrical energy from the first generator 104$a$ through the first junction box 404) when a demand or load of at least one of the first motor 204$a$ or the second motor 204$b$ that are being provided with power through the first junction box 404 is lower than power produced by the generator 104$a$ (e.g., the generator 104$a$ is producing more power than required). On the other hand, the first backup battery pack 412 may discharge or provide power to the first junction box 404 for transfer to the first motor 204$a$ or the second motor 204$b$ when the load or demand required by at least one of the first motor 204$a$ or the second motor 204$b$ as electrically coupled with the first junction box 404 exceeds an amount of power that the generator 104$a$ can provide. In this way, the first backup battery pack 412 can facilitate load or power smoothing and exchange power with the first junction box 404 to account for transient states or unbalanced load requirements (e.g., the load exceeding the power produced by the first generator 104$a$ or vice versa).

Figure 6:
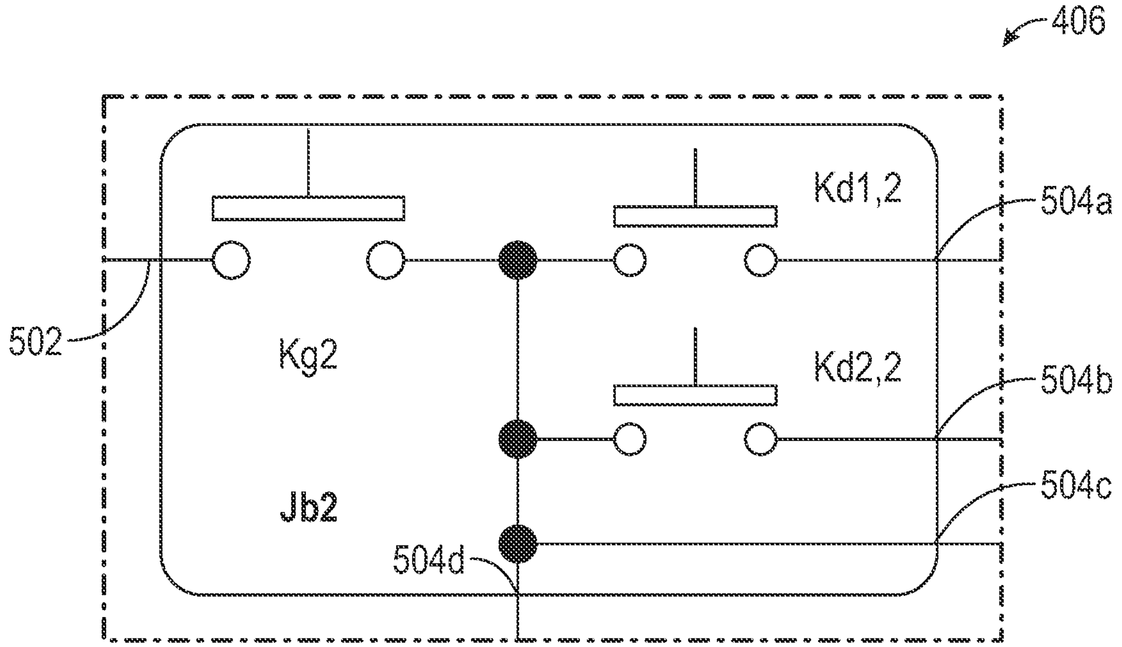
FIG. 6 is a diagram of a second junction box of the power generation and distribution system of FIG. 4, according to some embodiments.

Referring to FIGS. 4 and 6, the second junction box 406 (JB2) is similar to the first junction box 404 but is electrically coupled with the second generator 104$b$ and the second converter 108$b$ through the input 502 and cable 260$b$, and electrically coupled with the first motor 204$a$ and the second motor 204$b$ through the first output 504$a$ and cable 256$b$ and the second output 504$b$ and cable 258$b$, respectively. The third output 504$c$ is electrically coupled with an input of the third junction box 408 through cable 264$b$, according to some embodiments. In some embodiments, the fourth output 504$d$ is electrically coupled with a second backup battery pack 414 through cable 262$b$. The second junction box 406 may be operated similarly to the first junction box 404 by transitioning the switches between the different states in order to direct power to the first motor 204$a$ or the second motor 204$b$. The second junction box 406 includes a switch $Kg_2$ that is similar to the switch $Kg_1$ of the first junction box 404, according to some embodiments. In some embodiments, the second junction box 406 also includes a switch $Kd_{1,2}$ that is similar to the switch $Kd_{1,1}$, and a switch $Kd_{2,2}$ that is similar to the switch $Kd_{2,1}$.

Figure 7:
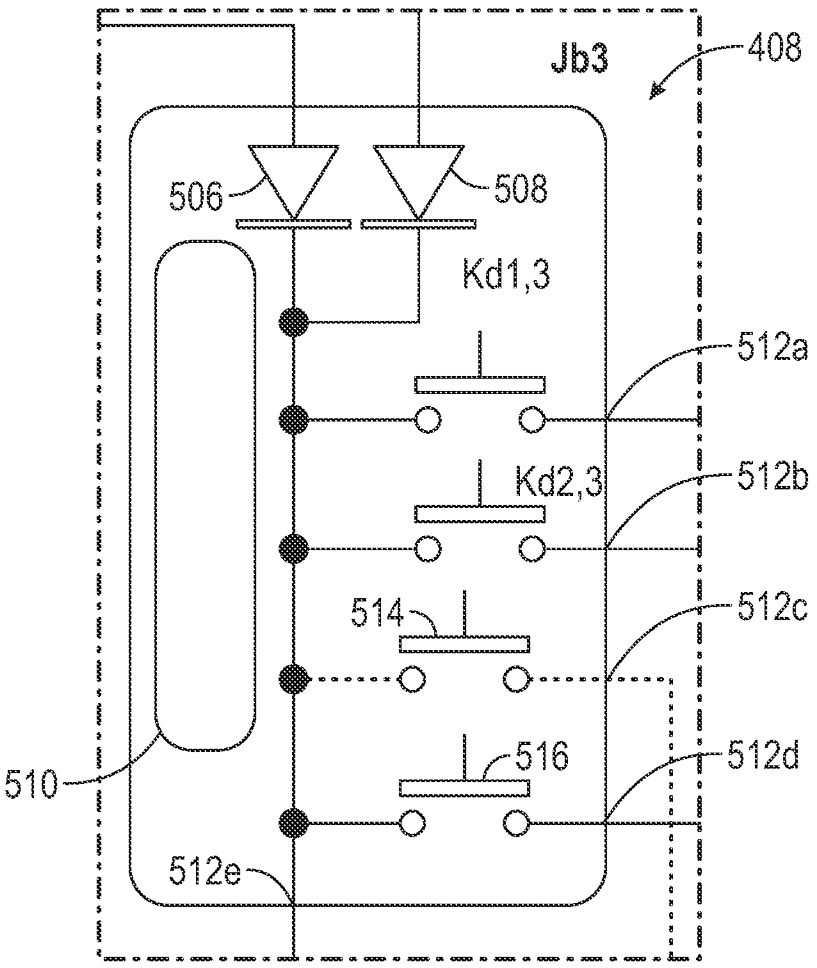
FIG. 7 is diagram of a third junction box of the power generation and distribution system of FIG. 4, according to some embodiments.

Referring to FIGS. 4 and 7, the third junction box 408 (JB3) includes a first input diode 506, a second input diode 508, a first output 512$a$, a second output 512$b$, a third output 512$c$, a fourth output 512$d$, and a fifth output 512$e$, according to some embodiments. The first input diode 506 is configured to receive electrical power from the second junction box 406 through cable 264$a$, while the second input diode 508 is configured to receive electrical power from the first junction box 404 through cable 264$b$. The third junction box 408 includes a first switch, switch $Kd_{1,3}$, a second switch, switch $Kd_{2,3}$, a third switch 514, and a fourth switch 516. The switch $Kd_{1,3}$ is configured to transition between an open position and a closed position to deliver electrical power from the first input diode 506 and the second input diode 508 to the first motor 204*a* (when in the closed position) through cable 256*c*, according to some embodiments. The switch $Kd_{2,3}$ is configured to transition between an open position and a closed position to deliver electrical power from the first input diode 506 and the second input diode 508 to the second motor 204*b* (when in the closed position) through cable 258*c*. The third switch 514 is configured to transition between an open position and a closed position to electrically couple with an overvoltage management circuit 418 through the third output 512*c* and cable 262*d*, according to some embodiments. The fourth switch 516 is configured to transition between an open position and a closed position to electrically couple with an auxiliary power distributor 420 and auxiliary power loads 422 through cables 262*e*, according to some embodiments.

In some embodiments, the inputs of each of the switches of the third junction box 408 are electrically coupled with the first input diode 506 and the second input diode 508. The third junction box 408 also includes a controller 510 that is configured to control operation of the switches of the first junction box 404, the second junction box 406, and the third junction box 408. The fifth output 512*e* may be electrically coupled with a third backup battery pack 416. The inputs of each of the switches of the third junction box 408 are electrically coupled (e.g., via a wired connection) with both the input diodes 506 and 508, and also with the fifth output 512*e*. The auxiliary power distributor 420 may be a DC-DC converter and can receive electrical power from any of the third junction box 408, the first junction box 404, or the second junction box 406. The auxiliary power distributor 420 provides 800 volt, 270 volt, and 28 volt DC power for auxiliary loads (e.g., the 28 volt auxiliary power loads 422) of the aircraft 10. The input diode 506 receives power from the second junction box 406 through cable 264*b*, and the input diode 508 receives power from the first junction box 404 through cable 264*a*, according to some embodiments. The auxiliary power distributor 420 can also provide power to actuators.

The third junction box 408 generally receives power from both the first junction box 404 and the second junction box 406 and sums the power. For example, if the first junction box 404 fails, the third junction box 408 may still receive power from the second junction box 406. The overvoltage management circuit 418 may be an optional component of the system 100. The overvoltage management circuit 418 receives electrical energy from the third junction box 408 (e.g., when the switch 514 is closed) in situations where electrical power is being generated by the turbine engine 102 and generators 104 but is not required by the motors 204 and has nowhere else to go (e.g., the backup battery packs 412, 414, and 416 are all at full capacity). The overvoltage management circuit 418 is configured to receive excess electrical power from the third junction box 408 and “dump” the excess electrical power by converting the excess electrical power into heat. The overvoltage management circuit 418 may achieve management of the overvoltage condition using a variety of circuitry such as a metal oxide varistor (“MOV”), a field-effect transistor (“FET”) with a microcontroller, a FET and resistors with Zener control, etc. The overvoltage management circuit 418 may include a solid state switch configured to convert excess power into heat. In some embodiments, in order to maintain speed of the propellers 208 at a constant speed, the motors 204 may function as generators and provide energy back into the system 100. The back-generation of electrical power at the motors 204 can be another source of excess power that is converted by the overvoltage management circuit 418 into heat if there is no other available battery to be charged with the back-generated electrical power or if there is insufficient battery power provided (e.g., when the power supply is at or below a threshold value). The overvoltage management circuit 418 may generally be any circuit or device capable of receiving electrical power and converting the electrical power into heat, or other energy source for dissipation from the system 100.

Figure 9:
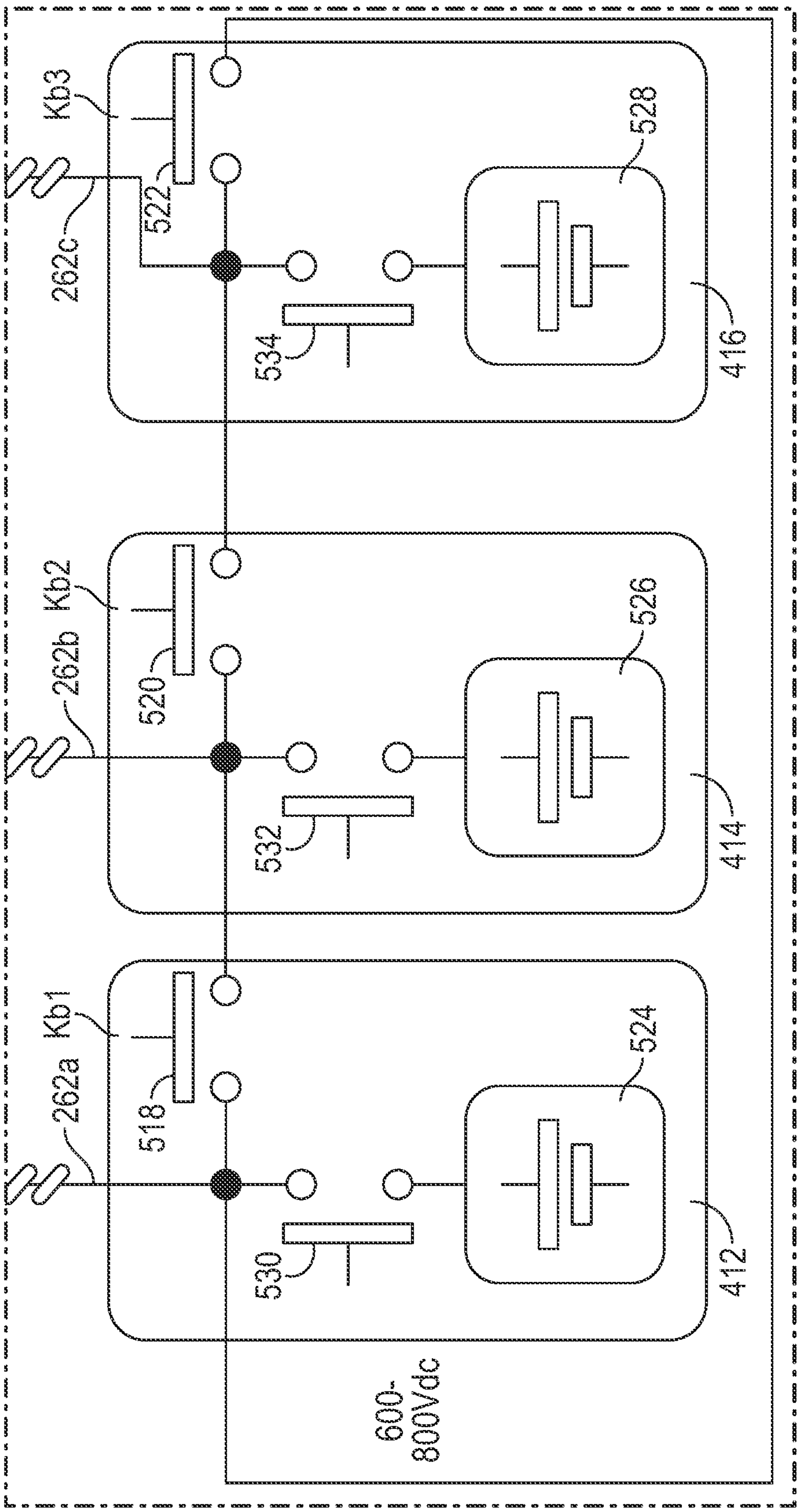
FIG. 9 is a diagram of backup batteries of the power generation and distribution system of FIG. 4, according to some embodiments.

Referring to FIGS. 4 and 9, the backup battery packs 412, 414, and 416, each include a battery, shown as battery 524, battery 526, and battery 528, according to some embodiments. In some embodiments, the backup battery packs 412, 414, and 416, also include a corresponding pair of switches. The first backup battery pack 412 includes a first switch $Kb_1$ that is configured to transition between an open position and a closed position to electrically de-couple and couple the battery 524 of the first backup battery pack 412 with the first junction box 404. When the first switch $Kb_1$ is in the closed position, a closed path is formed between an input 530 of the backup battery pack 412 and the battery 524. The second backup battery pack 414 similarly includes a switch $Kb_2$ and an input 532. The switch $Kb_2$ of the second backup battery pack 414 is configured to transition between the open position and the closed position to electrically de-couple or couple the battery 526 of the second backup battery pack 414 with the second junction box 406. The third backup battery pack 416 also includes a switch $Kb_3$ and an input 534. The switch $Kb_3$ is configured to transition between the open position and the closed position to electrically de-couple or couple the battery 528 of the third backup battery pack 416 with the third junction box 408. The backup battery packs 412, 414, and 416 may be electrically coupled with the corresponding cables 262*a*, 262*b*, and 262*c* through two-pole plugs. Backup battery packs or modules may also be placed in other locations in the circuit, for example, three battery modules at each input to inverters 202*a*, 202*b*, and 202*c* of each motor.

The power generation and distribution system 100 may include a high-value resistor (e.g., 1 mega Ohm) connected to the positive side of the buses of the power generation and distribution system 100, and a similar high-value resistor (e.g., 1 mega Ohm) connected to the negative side of the buses of the power generation and distribution system 100. The high-value resistors are both electrically coupled with a neutral point which is connected to a frame of the aircraft 10 (e.g., to ground the power generation and distribution system 100). This arrangement can limit how much the voltage of the chassis of the aircraft 10 fluctuates in relation to the battery packs 412-416. For example, airframes of aircrafts may pick up electrostatic potential by flying through the atmosphere even up to tens of thousands of volts. Advantageously, the use of the high-value resistors on the positive and negative terminals of the buses of the power generation and distribution system 100, electrically coupled with a neutral point, which is then electrically coupled with the frame of the aircraft 10, keep charge from developing on the frame of the aircraft 10 relative to the battery packs 412-416. The high values of the high-value resistors allow small currents to flow from the airframe chassis of the aircraft 10 to the battery packs 412-416 in order to maintain a balance of voltages between branches of the power generation and distribution system 100, the battery packs 412-416, and the airframe of the aircraft 10.

Referring still to FIGS. 4 and 9, the backup battery packs 412-416 can be electrically couple with each other in parallel. Each of the backup battery packs 412-416 include a corresponding switch that is transitionable between an open position and a closed position in order to electrically de-couple the corresponding battery (e.g., the battery 524, the battery 526, or the battery 528) from the parallel electrical coupling. In some embodiments, the first backup battery pack 412 includes a switch 518 that is configured to transition into a closed position to electrically couple the battery 524 of the first backup battery pack 412 with the battery 528 of the second backup battery pack 414. When the switch 518 is transitioned into the open position, the first backup battery pack 412 is electrically isolated from the second backup battery pack 414 (e.g., electrical power is limited from transferring between the first backup battery pack 412 and the second backup battery pack 414). Similarly, the second backup battery pack 414 includes a switch 520 that is transitionable between an open position in order to electrically isolate the second backup battery pack 414 from the first backup battery pack 412 and the third backup battery pack 416 and a closed position in order to electrically couple the second backup battery pack 414 with the neighboring first backup battery pack 412 and third backup battery pack 416. The third backup battery pack 416 also includes a switch 522 transitionable between an open and closed position to electrically couple or decouple the third backup battery pack 416 with the second backup battery pack 414. Advantageously, the switches 518, 520, and 522 allow the backup battery packs 412, 414, and 416 to be isolated (e.g., individually electrically de-coupled) from each other or from the system in the case of battery failure. Further, the system includes the three backup battery packs 412, 414, and 416 in order to provide triple redundancy so that if one or two of the backup battery packs fail, a remaining functional backup battery pack can be electrically coupled with the system and provide additional power due to increased load requirements by the first motor 204*a* or the second motor 204*b*.

The backup battery packs 412, 414, and 416 may be used as auxiliary or alternative power sources for the electric motor 204*a* and the electric motor 204*b* in case of a corrective procedure (e.g., a remedial procedure such as an emergency landing that may be required if, for example the turbine engine 102 fails, or both the generator 104*a* and the generator 104*b* malfunction). Advantageously, the system 100 includes three of the backup battery packs 412, 414, and 416 for triple redundancy. In some embodiments, in case of a failure of the turbine engine 102, the generators 104, or the converters 108, the generators 104 will cease sending power due to the diodes of the system 100. In the case of an internal short in the generators 104 or the converters 108 (e.g., when the engine power system goes offline), the battery packs 412, 414, and 416 supply power to their respective branches. The backup battery packs 412, 414, and 416 can provide electrical power to the motor 204*a* and the motor 204*b* through the first junction box 404, the second junction box 406, or the third junction box 408 such that the motor 204*a* and the motor 204*b* can be operated to land the aircraft 10 on the power that is stored in the backup battery packs 412, 414, and 416. In this way, the backup battery packs 412, 414, and 416 can function to provide triple redundancy supplemental power as a source of power during failure of the turbine engine 102 to allow for emergency landing, and to also perform load smoothing such as when a required amount of power by the motor 204*a* or the motor 204*b* rapidly increases at a pace that the generator 104 and turbines 102 cannot provide sufficient power. The backup battery packs 412, 414, and 416 can also provide supplemental power when power required by the motors 204 exceeds a capability of power that can be provided by the turbine engine 102 (e.g., even when the turbine engine 102 is operational, the backup battery packs 412, 414, and 416 may provide supplemental power). The backup battery packs 412, 414, and 416 may provide supplemental power due to performance of the aircraft 10 at takeoff, a thigh vehicle weights or high altitudes, during wind gusts, and during maneuvers of the aircraft 10. Since the backup battery packs 412, 414, and 416 are sized to allow for safe landing of the aircraft 10 even after failure of the turbine engine 102, the backup battery packs 412, 414, and 416 can also provide sufficient supplemental power when the turbine engine 102 is operational.

Figure 8:
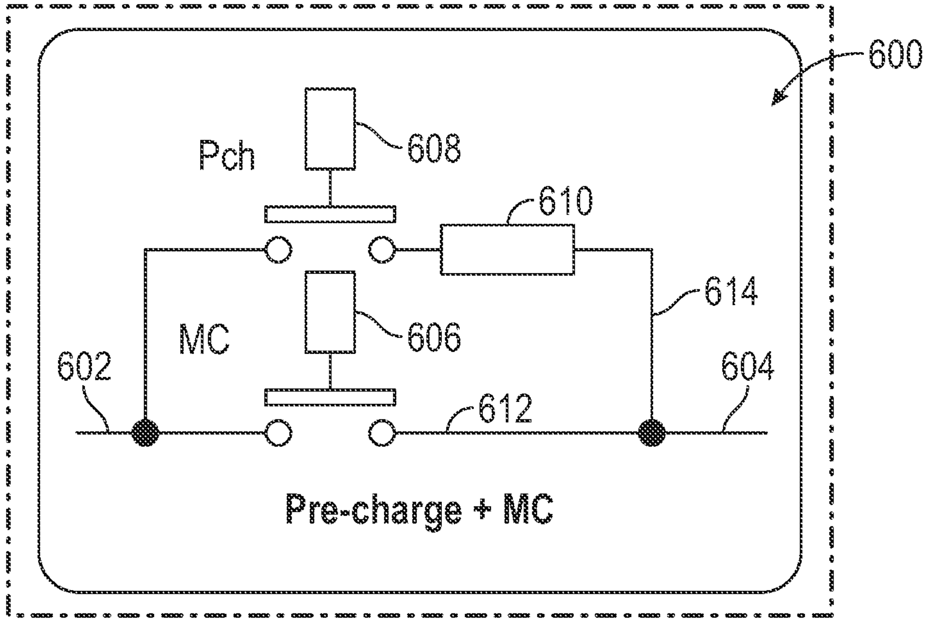
FIG. 8 is a diagram of a pre-charge circuit of the power generation and distribution system of FIG. 4, according to some embodiments.

Referring to FIGS. 4 and 8, the switch $Kg_1$ and the switch $Kg_2$ of the first junction box 404 and the second junction box 406 may be provided as a pre-charge circuit or component, shown as pre-charge system 600. The pre-charge system 600 generally includes an input 602, an output 604, a main line 612 (e.g., a main wire, a main cable, etc.), a bypass line 614 (e.g., a secondary wire, a secondary cable, etc.), a switch 606, and a switch 608. The bypass line 614 includes the switch 608 and a resistor 610. The bypass line 614 may be a significantly smaller size than the main line 612. When the system 100 is initially started up, immediately closing the switch 606 (e.g., the master controller) may cause capacitors in the generators 104 and the motor inverters 202 to produce large surge charge or discharge currents, causing arcing. In order to mitigate arcing, a pre-charge operation can be performed by closing the switch 608 (e.g., a pre-charge switch) and allowing electrical power to flow from the generators 104 to the motor inverters 202, to charge capacitors downstream of the junction boxes 404, 406, and 408. The bypass line 614 is configured to allow trickle charging of the capacitors downstream of the junction boxes 404, 406, and 408, and once the capacitors are fully charged, the switch 606 may be closed to allow the transfer of electrical power through the main line 612. The switch 608 may be subsequently opened to reduce the power losses from the resistor 610.

Referring to FIGS. 4-9, the system 100 may be equipped with two generators 104 as shown, or may be equipped with three generators 104. The system 100 provides triple redundancy so that the system 100 can still operate and provide power to the motors 204 even if a single component fails. The system 100 provides triply redundant paths of power flow from the generators 104 to the motors 204. For example, if the generator 104*a* fails, the generator 104*b* may still provide power to the second junction box 406 which can distribute power to the first motor 204*a* or the second motor 204*b*. If only one of the generators 104 fail, the backup battery packs 412, 414, and 416 may provide supplemental power as the aircraft 10 goes from a high power state to a lower power state (e.g., decelerate from high speed, accelerate from hover to a mid-speed where the power is minimum, etc.). Likewise, if the cable 260*a* shorts, the switch $Kg_1$ of the first junction box 404 can be opened to bypass the first junction box 404 and the cable 260*a* at which the short has occurred. The junction boxes 404, 406, and 408 may be positioned in a single box with different compartments, or may be positioned in completely separate boxes. Advantageously, providing the junction boxes 404, 406, and 408 in separate discrete containers facilitates triple redundancy in the junction boxes so that if a single junction box fails, for example due to fire, it is limited from transferring to the next junction box. If the first junction box 404 fails, the second junction box 406 can still provide power to the first motor 204*a* or the second motor 204*b*. The controller 510 may be positioned in a single junction box as shown, or may be provided as several separate controllers in each of the junction boxes 404, 406, and 408, such that each junction box can operate independently. The system 100 also provides triple redundancy of the inverters 202 at each motor 204.

The system 100 also provides triple redundancy of the backup battery packs 412, 414, and 416. For example, if a short occurs in the cable 262*a* such that the first backup battery pack 412 cannot exchange electrical power directly with the first junction box 404, the $Kb_1$ switch of the first backup battery pack 412 may be transitioned into the open position, and the switch 518 may be closed such that the backup battery pack 412 provides or receives electrical power through the cable 262*b* or the cable 262*c* to the motor 204*a* or the motor 204*b*. The system 100 also includes multiple generators 104 (e.g., two or three) such that even if one of the generators fails, the system 100 can still provide power for the motors 204 with a generator that has not yet failed. In some embodiments, the generators 104 are oversized so that if one of the generators 104 fails, the other generator 104 can provide power for the entire system 100. It should be understood that any of the contactors or switches described herein (e.g., $Kg_1$, $Kg_2$, $Kd_1$, $Kd_2$, etc.) may be mechanical contactors, solid state contactors, or the system 100 may include any combination of solid state and mechanical contactors or switches. The contactors or switches described herein may be electromechanical contactors with moderate speed (e.g., less than 50 milliseconds). In some embodiments, $Kb_1$, $Kb_2$, and $Kb_3$ are solid state contactors. Any of the switches or contactors described herein may also include sensors configured to measure current or voltage, or position of the contactors, which may be provided to the controller 510 for use in controlling the system 100.

The system 100 advantageously provides a scalable aircraft power propulsion system with multiple redundancies. The system 100 enables the usage of different types of energy sources and their isolation in the case of failures such as short or open circuits, paralleling for efficient usage, storage of energy, and voltages surge clipping. The system 100 utilizes efficient DC bus pre-charging and can operate in different modes and for different loads at the motors 204. The system 100 advantageously provides reliable operation of the aircraft 10 with electrical sub-systems (e.g., the motors, generators, and power electronics). The system 100 can facilitate convenient and corrective procedures or actions (e.g., emergency landings) for faults in the system 100, and provides enhanced dynamic performance during normal or non-emergency operation of the system 100.

Figure 10:
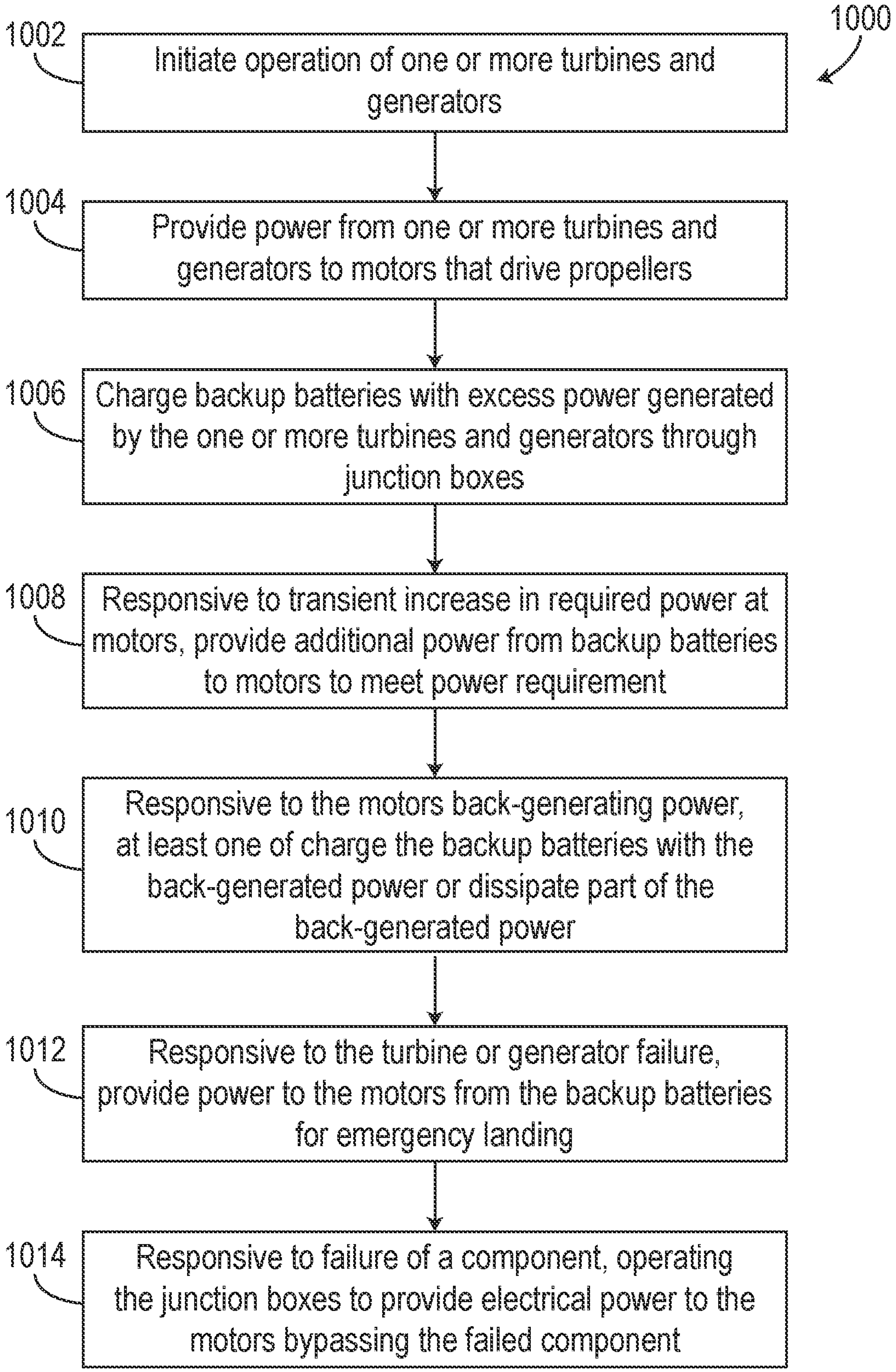
FIG. 10 is a flow diagram of a process for starting and using a power generation and distribution system for an electric aircraft with multiple redundancies, according to some embodiments.

Referring to FIG. 10, a flow diagram of a process 1000 for powering up and controlling the system 100 includes steps 1002-1012, according to some embodiments. The process 1000 can be performed by the controller 510 of the system 100. The flow diagram for the process 1000 summarizes the operation of the system 100 and illustrates the advantageous redundancies of the system 100.

The process 1000 includes initiating operation of one or more turbine engines and generators (step 1002), according to some embodiments. Initiating operation of the turbine engines and generators can include powering up the turbine engine such that the turbine engine consumes fuel to produce mechanical energy (e.g., to drive a driveshaft). The generators are driven by the turbine engine and begin to generate AC electrical power at step 1002 which is provided to converters.

The process 1000 includes providing power from the one or more turbine engines and generators to motors that drive propellers (step 1004), according to some embodiments. Step 1004 can include closing a pre-charge circuit in order to balance capacitors between the generator side and the motor side of the system before closing a main switch or contactor is closed. Once the main switch or contactor is closed (e.g., switch 606), the generators can provide electrical power to the motors for driving the propellers. The power can be provided by the generators as required by the motors to drive the propellers at a desired speed. In some embodiments, the motors and propellers are controlled by flight control computers in order to draw a required amount of power to drive the propellers to perform an aerial maneuver.

The process 1000 includes charging backup batteries with excess power generated by the one or more turbine engines and generators through junction boxes (step 1006), according to some embodiments. In some embodiments, step 1006 includes providing electrical power to any of the backup battery packs 412-416 that have available capacity to be charged. For example, if the generators 104 are producing electrical power that exceeds a requirement by the motors 204, the excess electrical power can be used to charge the backup battery packs 412-416 for use at a later time.

The process 1000 includes, responsive to a transient increase in require power at the motors, providing additional power from the backup batteries to the motors in order to meet power requirements of the motors (step 1008), according to some embodiments. The motors 204 may change in their power draw at a rate that exceeds the ability of the generators 104 to provide power. The backup batteries can provide supplemental power at a faster pace to the motors 204 in order to account for the lag of the generators 104. In some embodiments, the backup battery packs 412-416 provide supplemental power during transient ramp ups in required power at the motor in order to ensure that the motors 204 continually receive required electrical power.

The process 1000 includes, responsive to the motors back-generating power, at least one of charge the backup batteries with the back-generated power or dissipate part of the back-generated power (step 1010), according to some embodiments. In some embodiments, when the motors 204 are required to keep the propellers 208 at a constant speed, the motors 204 may be back-driven by the propellers 208 (e.g., regenerative braking) in certain scenarios which may cause the motors 204 to function as generators and back-generate electrical power. The back-generated electrical power from the motors 204 can be used to charge the backup battery packs 412-416 through the junction box 404, the junction box 406, or the junction box 408. In some embodiments, if the motors 204 back-generate electrical power and the backup battery packs 412-416 are at full capacity, the back-generated electrical power is routed to the overvoltage management circuit 418 or other energy dissipator to dissipate the back-generated electrical power.

The process 1000 includes, responsive to the turbine engine or generator failure, providing power to the motors from the backup batteries for a corrective procedure or action (e.g., an emergency landing) (step 1012), according to some embodiments. In some embodiments, if only one of the generators 104 fail, the other available generator 104 can provide power for landing the aircraft. If both of the generators 104 fail, the backup battery packs 412-416 can provide power for the motors 204 in order to land the aircraft. Advantageously, the system includes multiple generators 104 and paths for power to flow to the motors in order to provide redundancies in the case of failure. Similarly, the backup battery packs 412-416 can advantageously provide power for the motors 204 in case of the corrective procedure or action (e.g., the emergency landing). For example, in some (but not necessarily all) cases of failure of the turbine engine 102, the backup battery packs 412-416 may provide power in order to land the aircraft 10.

The process 1000 includes, responsive to failure of a component, operating the junction boxes to provide electrical power to the motors bypassing the failed component (step 1014), according to some embodiments. The failure of the component may be a short circuit, an open circuit, or any other failure of any of the cables, components, junction boxes, electrical components, generators, converters, inverters, etc., of the power generation and distribution system 100. For example, if a cable shorts or breaks, the junction boxes 404, 406, and 408 may be transitioned into states such that electrical power flows from the generators 104 to the motors 204 bypassing the shorted or damaged cable.

Configuration of Exemplary Embodiments

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

References herein to the positions of elements (e.g., “top,” “bottom,” “above,” “below”) are merely used to describe the orientation of various elements in the FIGURES. It should be noted that the orientation of various elements may differ according to other exemplary embodiments, and that such variations are intended to be encompassed by the present disclosure.

What is claimed is:

1. A power generation and distribution system for an electric aircraft, the power generation and distribution system comprising:

a plurality of generators driven by a turbine engine to produce electrical power;

a plurality of motors configured to drive a plurality of propellers of the electric aircraft;

a plurality of junction boxes, one or more of the junction boxes comprising contactors transitionable between an open position and a closed position, the junction boxes each configured to selectively provide electrical power from at least one of the plurality of generators to any of the plurality of motors; and a plurality of backup batteries, the plurality of backup batteries configured to provide electrical power to the plurality of motors through the plurality of junction boxes to power the plurality of motors during at least a remedial procedure or emergency procedure when the produced electrical power is not supplied by one or more of the plurality of generators.

2. The power generation and distribution system of claim 1, wherein the plurality of junction boxes comprise:

a first junction box configured to receive electrical power from a first of the plurality of generators, the first junction box configured to direct power from the first of the plurality of generators to at least one of a first motor or a second motor of the plurality of motors; and a second junction box configured to receive electrical power from a second of the plurality of generators, the second junction box configured to direct power from the second of the plurality of generators to at least one of the first motor or the second motor of the plurality of motors.

3. The power generation and distribution system of claim 2, wherein the plurality of junction boxes further comprise:

a third junction box configured to receive and sum electrical power from both the first junction box and the second junction box, the third junction box configured to direct power from the first junction box and the second junction box to at least one of the first motor or the second motor of the plurality of motors.

4. The power generation and distribution system of claim 3, wherein the first junction box, the second junction box, and the third junction box provide a plurality of different paths to provide electrical power from the plurality of generators to each of the plurality of motors, the plurality of different paths providing redundancy such that the electrical power can be provided from at least one of the plurality of generators to the plurality of motors responsive to failure of one of the plurality of generators or a short circuit or open circuit in a cable of the power generation and distribution system.

5. The power generation and distribution system of claim 1, wherein each of the plurality of backup batteries are configured to receive electrical power from one or more of the plurality of generators through a corresponding one of the plurality of junction boxes, the plurality of backup batteries electrically coupled with each other in parallel and comprising a first plurality of contactors transitionable into an open position to electrically de-couple one or more of the plurality of backup batteries from being electrically coupled with each other in, and a second plurality of contactors transitionable into an open position to electrically de-couple any of the plurality of backup batteries from the corresponding one of the plurality of junction boxes.

6. The power generation and distribution system of claim 5, wherein the first plurality of contactors of the plurality of backup batteries and the second plurality of contactors of the plurality of backup batteries are solid state switches configured to transition between the open position and a closed position.

7. The power generation and distribution system of claim 1, further comprising a pre-charge circuit provided for at least one of the plurality of junction boxes, the pre-charge circuit comprising:

a main cable and a first contactor;

a bypass cable and a second contactor; and a resistor positioned along the bypass cable;

wherein when the power generation and distribution system is powered on, the first contactor is maintained in an open position and the second contactor is transitioned into a closed position so that electrical power passes through the bypass cable and the resistor, the first contactor maintained in the open position and the second contactor maintained in the closed position until a plurality of capacitors downstream of the pre-charge circuit are charged, wherein in response to the plurality of capacitors being charged, the first contactor is transitioned into the closed position and the second contactor is transitioned into the open position so that the electrical power flows through the main cable and the first contactor.

8. An electric aircraft comprising:

a fuselage;

wings rotatably coupled with the fuselage and configured to be driven to rotate relative to the fuselage;

a plurality of propellers; and a power generation and distribution system comprising:

a plurality of generators driven by a turbine engine to produce electrical power;

a plurality of motors configured to drive the plurality of propellers of the electric aircraft;

a plurality of junction boxes, each of the junction boxes comprising contactors transitionable between an open position and a closed position, the junction boxes each configured to selectively provide electrical power from at least one of the plurality of generators to any of the plurality of motors; and a plurality of backup batteries, the plurality of backup batteries configured to provide electrical power to the plurality of motors through the plurality of junction boxes to power the plurality of motors during at least a remedial procedure or emergency procedure.

9. The electric aircraft of claim 8, wherein the plurality of junction boxes comprise:

a first junction box configured to receive electrical power from a first of the plurality of generators, the first junction box configured to direct power from the first of the plurality of generators to at least one of a first motor or a second motor of the plurality of motors; and a second junction box configured to receive electrical power from a second of the plurality of generators, the second junction box configured to direct power from the second of the plurality of generators to at least one of the first motor or the second motor of the plurality of motors.

10. The electric aircraft of claim 9, wherein the plurality of junction boxes further comprise:

a third junction box configured to receive and sum electrical power from both the first junction box and the second junction box, the third junction box configured to direct power from the first junction box and the second junction box to at least one of the first motor or the second motor of the plurality of motors.

11. The electric aircraft of claim 10, wherein the first junction box, the second junction box, and the third junction box provide a plurality of different paths to provide electrical power from the plurality of generators to each of the plurality of motors, the plurality of different paths providing redundancy such that the electrical power can be provided from at least one of the plurality of generators to the plurality of motors responsive to failure of one of the plurality of generators or a short circuit or open circuit in a cable of the power generation and distribution system.

12. The electric aircraft of claim 8, wherein each of the plurality of backup batteries are configured to receive electrical power from one or more of the plurality of generators through a corresponding one of the plurality of junction boxes, the plurality of backup batteries electrically coupled with each other in parallel and comprising a first plurality of contactors transitionable into an open position to electrically de-couple one or more of the plurality of backup batteries from being electrically coupled with each other in parallel, and a second plurality of contactors transitionable into an open position to electrically de-couple any of the plurality of backup batteries from the corresponding one of the plurality of junction boxes.

13. The electric aircraft of claim 12, wherein the first plurality of contactors of the plurality of backup batteries and the second plurality of contactors of the plurality of backup batteries are solid state switches configured to transition between the open position and a closed position.

14. The electric aircraft of claim 8, further comprising a pre-charge circuit provided for at least one of the plurality of junction boxes, the pre-charge circuit comprising:

a main cable and a first contactor;

a bypass cable and a second contactor; and a resistor positioned along the bypass cable;

wherein when the power generation and distribution system is powered on, the first contactor is maintained in an open position and the second contactor is transitioned into a closed position so that electrical power passes through the bypass cable and the resistor, the first contactor maintained in the open position and the second contactor maintained in the closed position until a capacitor downstream of the pre-charge circuit is charged, wherein in response to the capacitor being charged, the first contactor is transitioned into the closed position and the second contactor is transitioned into the open position so that the electrical power flows through the main cable and the first contactor.

15. A method for generating and distributing power for an electric aircraft, the method comprising:

providing a power generation and distribution system including a plurality of generators driven by a turbine engine to produce electrical power, a plurality of motors configured to drive a plurality of propellers, a plurality of junction boxes each configured to direct power from at least one of the plurality of generators to any of the plurality of motors, and a plurality of backup batteries;

starting the power generation and distribution system;

responsive to increased demand for power at one or more of the plurality of motors, discharging energy from at least one of the plurality of backup batteries to supplement the electrical power produced by the plurality of generators to meet the increased demand at the one or more of the plurality of motors; and responsive to failure of at least one of the generators, discharging power from the plurality of backup batteries to the plurality of motors to perform a remedial procedure or emergency procedure with the electric aircraft.

16. The method of claim 15, wherein starting the power generation and distribution system comprises:

initiating operation of the turbine engine and the plurality of generators to produce electrical power;

operating a first contactor of a bypass cable of a pre-charge circuit to transition into a closed position such that the electrical power flows through the bypass cable, the first contactor, and a resistor, the first contactor of the pre-charge circuit maintained in the closed position until capacitors downstream at a plurality of motor inverters are balanced with voltage at a plurality of converters; and responsive to the capacitor at the plurality of motor inverters are balanced with the voltage at the plurality of converters, operating the first contactor into an open position and operating a second contactor of a main cable from an open position into a closed position such that electrical power generated by the plurality of generators flows through the main cable to the plurality of junction boxes and the plurality of motors.

17. The method of claim 15, further comprising:

responsive to the plurality of motors being back-driven by the propellers and generating electrical power, at least one of charging the plurality of backup batteries or dissipating the electrical power generated by the back-driving of the plurality of motors.

18. The method of claim 15, wherein the plurality of junction boxes provide a plurality of different paths for transfer of electrical power from the plurality of generators to the plurality of motors, the plurality of junction boxes each comprising contactors, wherein the method includes, responsive to failure of a component, operating the contactors of the plurality of junction boxes to provide electrical power from the plurality of generators to the plurality of motors bypassing the component.

19. The method of claim 15, wherein the plurality of junction boxes comprise:

a first junction box configured to receive electrical power from a first of the plurality of generators, the first junction box configured to direct power from the first of the plurality of generators to at least one of a first motor or a second motor of the plurality of motors; and a second junction box configured to receive electrical power from a second of the plurality of generators, the second junction box configured to direct power from the second of the plurality of generators to at least one of the first motor or the second motor of the plurality of motors.

20. The method of claim 19, the plurality of junction boxes further comprise:

a third junction box configured to receive and sum electrical power from both the first junction box and the second junction box, the third junction box configured to direct power from the first junction box and the second junction box to at least one of the first motor or the second motor of the plurality of motors.

* * * * *